United States Patent Office 3,608,307
Patented Sept. 28, 1971

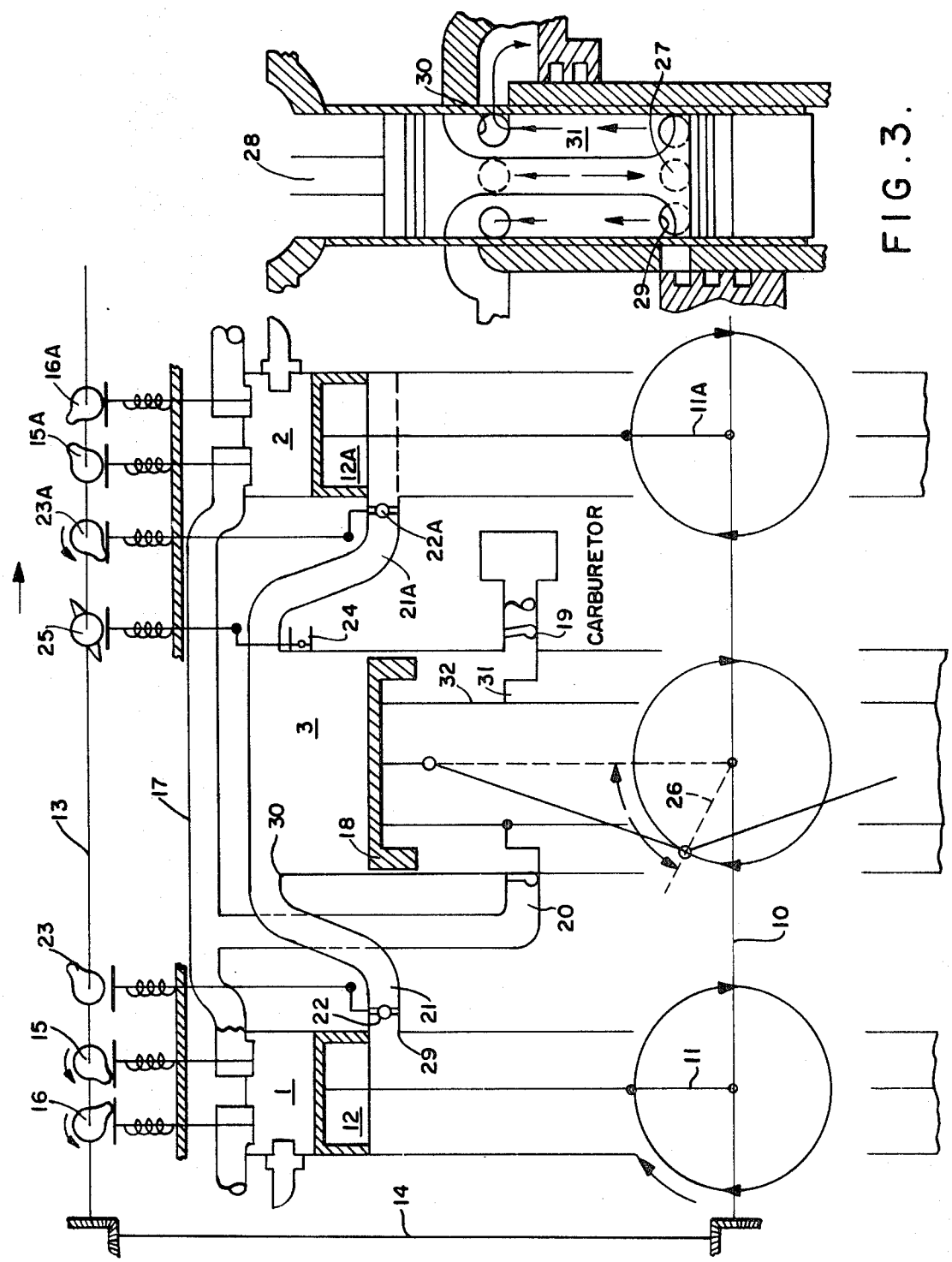

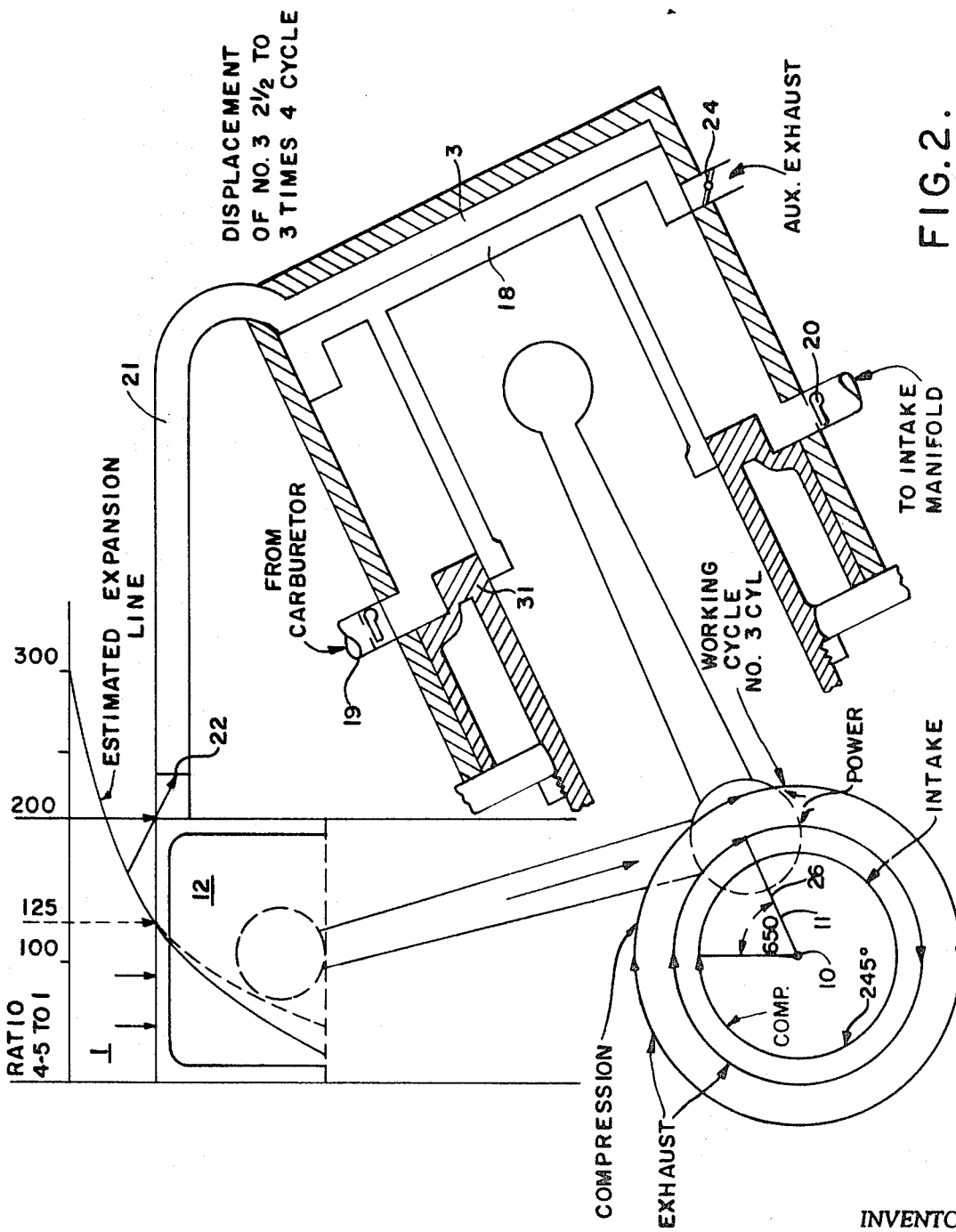

3,608,307
COMPOUND INTERNAL COMBUSTION ENGINE WITH RE-EXPANSION CYLINDER
Edwin J. Strom, R.R. 1, Wellington,
British Columbia, Canada
Filed May 7, 1969, Ser. No. 822,554
Int. Cl. F01b 73/00
U.S. Cl. 60—15     6 Claims

ABSTRACT OF THE DISCLOSURE

An internal combustion engine which uses partially expanded gases from the power stroke of the internal combustion cylinder to operate a double acting expansion cylinder to provide additional power to the crank shaft using the opposite portion of the expansion cylinder piston as a supercharger and providing timing means to control the flow of gases through communicating ports to obtain the maximum power, two internal combustion cylinders being used with one expansion cylinder to obtain maximum power.

---

Heretofore various types of internal combustion engines have been used and some have used re-expansion cylinders, but none have been entirely satisfactory and accordingly it is an objct of the invention to provide an internal combustion engine with a re-expansion cylinder to obtain maximum power from the fuel used.

Briefly the invention comprises an internal combustion engine with opposed cylinders on opposite sides of a crank shaft of which one side will be described, the other side being a duplicate thereof as is well known. A pair of cylinders having pistons and valves of the conventional type are arranged on opposite sides of an expansion cylinder of larger diameter with all the pistons operating on a common crank shaft with the expansion cylinder piston being approximately 65° behind the cranks of the other cylinders, the expansion cylinder chamber above the piston being alternately connected to the other cylinders during the power stroke after partial expansion of the gases to produce additional power, suitable valves being provided and operated by the conventional cam shaft in timed relation and the lower side of the expansion piston serving as a supercharger to the other cylinders and the exhaust from the expansion cylinder being controlled by a cam operated valve to take maximum advantage of the additional expansion of the gases.

Other objects of the invention will be apparent upon reference to the accompanying drawings wherein:

FIG. 1 is a diagrammatic illustration of the invention showing the internal combustion cylinders in top dead center and the expansion cylinder trailing by approximately 65° with the cranks and cams shown in the plane of the paper for convenience of illustration;

FIG. 2 is a modification illustrating the 65° displacement of the cylinders using crank throws in axial alignment; and FIG. 3 illustrates one form of piston valve suitable to control the flow of gas from one explosion cylinder to the expansion cylinder.

Referring more particularly to the drawings, a crank shaft 10 carries crank throws 11, 11A which are connected to piston 12, 12A by the usual connecting rods and since both cylinders are substantially the same only one will be described and the other may referred to with the postscript A for the corresponding parts where the description is necessary. A cam shaft 13 is driven by suitable bevel gears or the like through a shaft 14 to obtain the one to two ratio and carries an intake operating cam 15 and an exhaust operating cam 16 which controls suitable valves in the usual manner and the ignition is accomplished in the usual way by a spark plug or other suitable means, combustion gases are carried to the intake valve through a duct 17 which is connected to the expansion cylinder below the piston 18 thereof and combustible gas is furnished from a carburetor through a suitable port controlled by a check valve 19 into the lower portion of the double acting cylinder 3 and the piston 18 forces the gases past another check valve 20 into the supply duct 17 and to the intake valves to provide a supercharger. In communication with the cylinder 1 is a duct 21 to the cylinder 3 and a valve 22 controlled by a cam 23 provides communication at the proper times when the piston 12 is moved downwardly approximately 65° at which time the piston 18 is in its uppermost position and at this time piston 12A is in its power stroke and the valve 22A would open as the piston passes the port of the duct 21 thereby diverting some of the expansion gases into the cylinder 3 and producing power on the piston 18 and at the same time compressing the combustible gases below the piston 18 and forcing them into the duct 17 ready to supply the intake valve controlled by cam 15 of cylinder 1 so that a supercharging effect is obtained.

When the piston 18 of cylinder 3 is moved to its extreme bottom position a valve 24 is opened by a cam 25 having two lobes so as to operate for each rotation of the crank 10 and thereby take advantage of the power from both cylinder 1 and cylinder 2 and provide for the exhaust of the diverted gases into the cylinder 3.

It will be apparent that a suitable support and suitable bearings are provided with the conventional crank with the crank throws 11 and 11A being in alignment and the crank throw 26 of the cylinder 3 being displaced the 65° on the crank shaft 10.

Referring to FIG. 2 the cylinder 1 is shown in a vertical position and the cylinder 3 is shown inclined thereto at 65° to show another modification of the invention. This FIG. 2 shows the approximate timing of the various steps in the process and it also shows the opening of the duct 21 into the cylinder 1 as well as the estimated expansion and in this modification the crank throws can all be in alignment.

In FIG. 3 a valve suitable for the cam controlled valves 22, 24, and 22A is shown as a piston 27 having a stem 28 adapted to be operatively connected to the cam shaft 13 by an eccentric or other suitable means to control the flow of gases from port 29 of cylinder 1 to port 30 of cylinder 3 and takes the place of butterfly valve 22 shown as operating from cam 23. The piston valve 27 is provided with enlargements at each end to provide for sealing the ports at the proper time and providing for communication between the ports and the space within the valve cylinder 31 and this valve piston arrangement assures proper timing for the operation and is one way to accomplish this control with a minimum of leakage. The butterfly valves shown in the illustration of FIG. 1 are used to simplify the diagram and other types of valves may be used for this purpose.

From the above description the operation of the invention is believed to be clear and the four cycle engine cylinders 1 and 2 operate in the normal four cycle manner, but part of the expanding gases during the power stroke is diverted to the expansion cylinder 3 to produce additional power on the piston 18 and also produce the supercharging effect by the compression of the combustible gases between the piston and the gland 31 which engages the auxiliary skirt 32 of the piston 18 to provide the pumping action.

The 65° delay provides for the maximum pressure in the cylinders 1 and 2 until the port 29 is opened by the valve 22 to the expansion cylinder 3 and the additional expansion of the gases during the remainder of the power stroke of the internal combustion cylinder produces power on the internal combustion piston and also on the expansion chamber piston as explained above and the expansion chamber piston produces the supercharger effect on its undersurface compressing the gases against the gland 31.

While the engine of this invention has been illustrated primarily by diagrammatic drawings for purpose of simplicity, it is to be understood that apart from the invention as described and claimed various parts of the engine structure that are conventional are selected in accordance with the principle of good engine design by one versed in the art. For example the transfer ports 21 and transfer valves 22, 22A would be incorporated within a water jacket and cooled in the same manner as the engine cylinders. Also means not shown would be provided for lubrication of the transfer valves and the upper barrel of cylinder 3.

What is claimed is:

1. An internal combustion engine adapted to obtain additional power from the expansion of gas from the power stroke of a four cycle engine comprising a support, a pair of internal combustion cylinders on said support, a crank shaft supported on said support, pistons in said internal combustion cylinders operatively connected to said crank shaft 360° apart, a cam shaft operated in timed relation to said crank shaft, intake and exhaust valves to said internal combustion cylinders controlled by said cam shaft, an expansion cylinder having a piston operatively connected to said crank shaft for approximately 65° behind the pistons of said power cylinder, ports in said internal combustion cylinders communicating with the top of said expansion cylinder, valves in said ports, cams to control said valves in said ports whereby when the power stroke of the internal combustion cylinders occur the ports will be opened and the expanding gas from the corresponding internal combustion cylinder will enter the expansion cylinder and produce power in said expansion cylinder, an auxiliary exhaust port in said expansion cylinder to permit the gases to discharge after a substantial motion of the expansion piston, and valve means operated by said cam shaft to control said auxiliary exhaust port.

2. The invention according to claim 1 in which the expansion piston is a double acting piston and the undersurface operates with a gland to provide a supercharger and the space between the piston and gland is in communication with the source of combustible gas and in communication with the intake valve of the internal combustion cylinders.

3. An internal combustion engine adapted to obtain additional power from the expansion of gas from the power stroke of a four cycle engine comprising a support, a pair of internal combustion cylinders on said support, a crank shaft supported on said support, pistons in said internal combustion cylinders operatively connected to said crank shaft 360° apart, a cam shaft operated in timed relation to said crank shaft, intake and exhaust valves to said internal combustion cylinders controlled by said cam shaft, an expansion cylinder having a piston operatively connected to said crank shaft for approximately 65° behind the pistons of said power cylinder, ports in said internal combustion cylinders communicating with the top of said expansion cylinder, valves in said ports, cams to control said valves in said ports whereby when the power stroke of the internal combustion cylinders occurs the ports will be opened and the expanding gas from the corresponding internal combustion cylinder will enter the expansion cylinder and produce power in said expansion cylinder, an auxiliary exhaust port in said expansion cylinder to permit the gases to discharge after a substantial motion of the expansion piston, and valve means operated by said cam shaft to control said auxiliary exhaust port together with a second pair of internal combustion cylinders and a second expansion cylinder arranged in opposed relation.

4. The invention according to claim 1 in which the valves to said ports are piston valves.

5. The invention according to claim 1 in which the crank throws are in alignment and the expansion cylinder is at approximately 65° to the internal combustion cylinders.

6. The invention according to claim 1 in which the ports from said internal combustion cylinders to the expansion cylinder are located approximately 65° below the top of the internal combustion cylinders.

References Cited

UNITED STATES PATENTS

| | | | |
|---|---|---|---|
| 834,566 | 10/1906 | Dina | 60—15 |
| 1,006,167 | 10/1911 | Wright | 60—15 |
| 1,146,840 | 7/1915 | Bjur | 60—15 |
| 1,177,890 | 4/1916 | Ostergren et al. | 60—15 |
| 1,347,087 | 7/1920 | Gernandt | 60—15 |
| 2,220,764 | 11/1940 | Heylandt | 60—15 |
| 2,206,272 | 7/1940 | Toth | 60—15 |
| 3,408,811 | 11/1968 | Wishart | 60—15 |

FOREIGN PATENTS

| | | | |
|---|---|---|---|
| 614,873 | 9/1926 | France | 60—15 |
| 24,480 | 7/1901 | Switzerland | 60—15 |

OTHER REFERENCES

"Power Plant Engineering," Pourcell Compound Explosion Motor, issue of Jan. 15, 1921, p. 134.

MARTIN P. SCHWADRON, Primary Examiner

A. M. OSTRAGER, Assistant Examiner